United States Patent [19]

Students

[11] 4,325,720
[45] Apr. 20, 1982

[54] SHAPER NOZZLE FOR A CARBON DIOXIDE SNOW CYCLONE SEPARATOR

[75] Inventor: Peter A. Students, West Chester, Ill.

[73] Assignee: Chemetron Corporation, Pittsburgh, Pa.

[21] Appl. No.: 232,110

[22] Filed: Feb. 6, 1981

[51] Int. Cl.³ ............................................. F25J 1/00
[52] U.S. Cl. ......................................... 62/35; 62/10; 55/426; 55/447
[58] Field of Search ............... 62/35, 10; 55/424, 426, 55/447, 458

[56] References Cited

U.S. PATENT DOCUMENTS 1,546,682  7/1925  Slate .
2,486,624  11/1949  Williamson ............................. 62/10
3,786,644  1/1974  Rich et al. ............................. 62/35

*Primary Examiner*—Norman Yudkoff
*Attorney, Agent, or Firm*—John K. Williamson

[57] ABSTRACT

A nozzle for a carbon dioxide snow cyclone separator shapes the swirling discharge from the separator to form a unidirectional downwardly directed flow. The nozzle passage is defined by an annular series of transversely concave, juxtaposed, elongate surfaces formed in the body of the nozzle, whereby the passage is scalloped in transverse cross-section. In preferred forms, there are four identical, laterally contiguous, surfaces in the annular series defining the nozzle passage, each of which extends through an arc of $\pi$ radians.

6 Claims, 3 Drawing Figures

SHAPER NOZZLE FOR A CARBON DIOXIDE SNOW CYCLONE SEPARATOR

TECHNICAL FIELD

This invention relates to carbon dioxide snow generators generally, and is particularly concerned with an improved nozzle for reshaping the discharge from a carbon dioxide snow generator of the type having a cyclone separator.

BACKGROUND ART

In the manufacture of carbon dioxide snow by flashing liquid carbon dioxide, there is created a mixed flow of carbon dioxide snow and vapor. In most applications, it is desired to separate the snow and vapor in the mixed flow, and numerous devices have been developed to this end. One such device is a cyclone separator which relies upon the combined actions of centrifugal force and gravity for separation of the snow in the mixed flow. Such a device is shown in U.S. Pat. No. 1,546,682 and is well known in the art.

One problem experienced with the use of cyclone separators is that the discharge flow is typically divergent due to the swirling motion imparted to the snow in the separator. The flow from the cyclone separator is cone-shaped and typically defines an included angle of 100°. While a divergent flow is acceptable in some applications, it is unacceptable where it is desired to accurately direct the flow, for example, as into a box packed with meat. In such latter applications, a confined, unidirectional flow is desired to avoid wastage of the formed snow.

Attempts to obtain a non-diverging flow from a cyclone separator have heretofore proved ineffective. Various types of nozzle structures have been employed at the discharge end of the cyclone separator to modify the shape of the discharge. A cylinder has been utilized, for example, to obtain a cylindrical flow from the cyclone separator. However, the length of cylinder required to completely reshape the discharge is so great that snow clogging problems are presented. Similarly, attempts to employ various types of baffle structure to reshape the discharge have met with failure due to snow clogging with resultant blockage of the discharge.

The aforementioned problem becomes particularly acute in high volume applications where, for example, meat boxes requiring five to ten pounds of carbon dioxide snow may be filled at the rate of five boxes per minute. Under such operating conditions, an appreciable loss of snow is unacceptable and downtime created by snow clogging problems simply cannot be tolerated.

SUMMARY OF THE INVENTION

The present invention comprises a nozzle capable of reshaping the discharge from a carbon dioxide snow cyclone separator to form a desired non-diverging flow without presenting snow clogging problems.

The nozzle of the present invention has a scalloped central passage defined by an annular series of transversely concave surfaces formed in the body of the nozzle. The swirling movement of the carbon dioxide snow in the discharge from the separator is quickly dissipated by the nozzle, yet there is presented no structure which is conducive to collecting snow particles within the nozzle. Thus, the formation of "snow bridges" in the nozzle passage, with the resultant blockage of flow, is avoided.

In the preferred embodiment, the annular series which circumscribes the nozzle passage has four transversely concave surfaces, each laterally contiguous with adjacent surfaces in the series and each extending through an arc of $\pi$ radians.

DETAILED DESCRIPTION OF THE INVENTION

Figure 1:
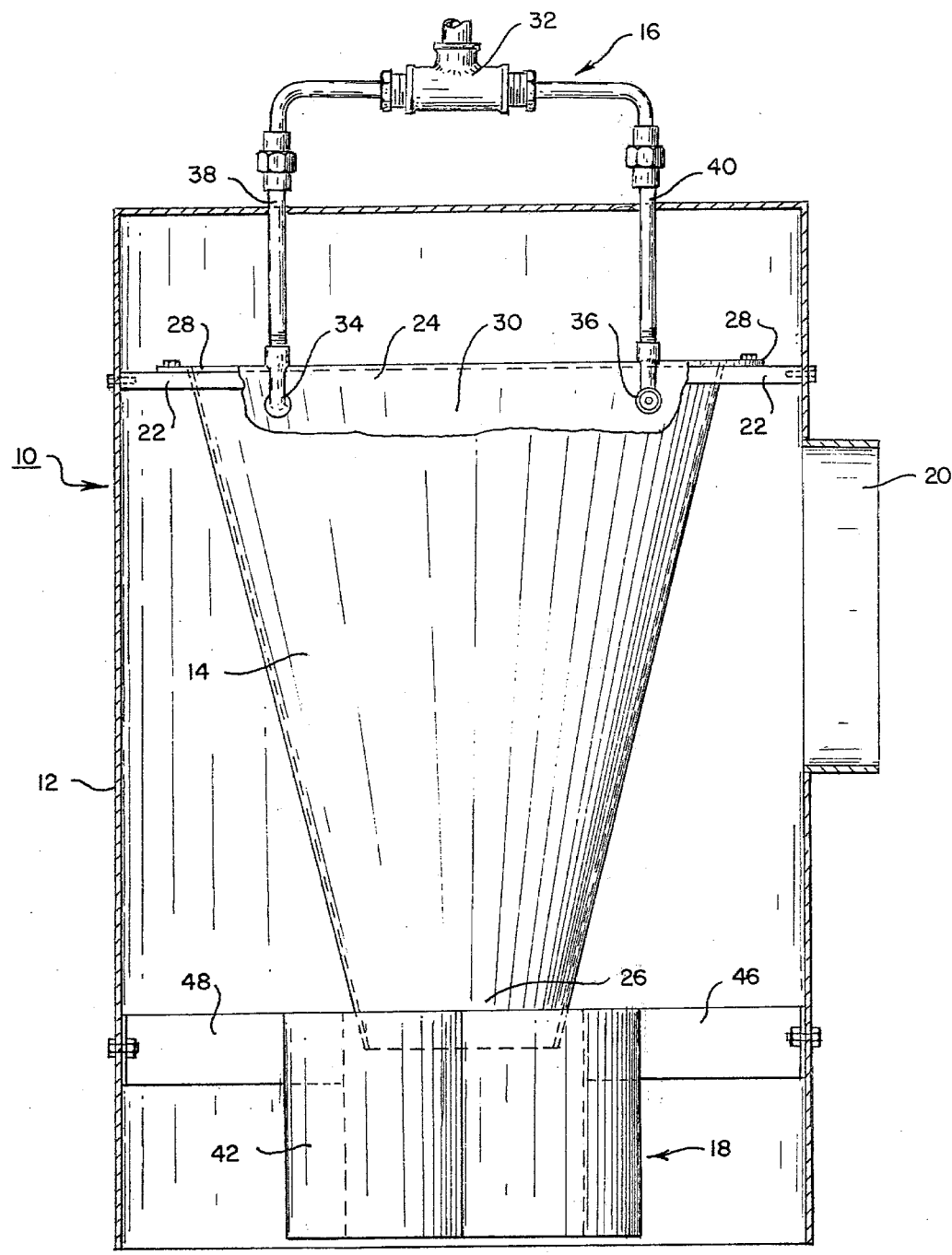
FIG. 1 is a vertical cross-sectional view of a snow hood constructed in accordance with the principles of the present invention, showing the nozzle disposed at the discharge end of the cyclone separator.

In FIG. 1, there is shown a cyclone separator type carbon dioxide snow hood comprising an open bottomed canopy 12, a separator cone 14 mounted in an inverted, axially upright position within the canopy, and a snow generator assembly 16 adapted to introduce a pair of tangentially directed mixed flows of carbon dioxide snow and vapor into the upper end of the separator cone 14. Though not shown, it is to be understood that the assembly 16 is in selective flow communication with a source of liquid carbon dioxide. A shaper nozzle 18 is mounted within the canopy 12 at the lower end of the separator cone 14 to receive the snow discharge therefrom.

The canopy 12 is of conventional box construction and has a vapor outlet 20 formed in the sidewall thereof. The outlet 20 is adapted to be coupled to an exhaust system (not shown) to permit removal of carbon dioxide vapor from the hood 10. A pair of cross members 22 are provided for mounting of the cone 14 in the canopy 12 as described.

The separator cone 14 is actually frustoconical, having an uppermost base end 24 and a smaller, discharge end 26 spaced therebelow. A flange 28 is provided on the base end 24 and engages the cross members 22 as shown in FIG. 1 for the securement of the cone 14 to the canopy. The separator cone 14 is hollow to present a separation chamber 30 which extends from the base end 24 to the discharge end 26.

The generator assembly 16 comprises a valve 32 in direct flow communication with the source of liquid carbon dioxide (not shown), a pair of orifice assemblies 34, 36 supported in diametrically opposed positions within the chamber 30 at the base end 24 of the cone 14, and a pair of conduits 38, 40 establishing of flow communication between the valve 32 and the respective orifice assemblies 34, 36 in a manner well-known in the art. The respective outlets of the orifice assemblies 34, 36 are disposed to introduce tangentially directed flows of mixed carbon dioxide snow and vapor into the separator chamber 30.

Figure 2:
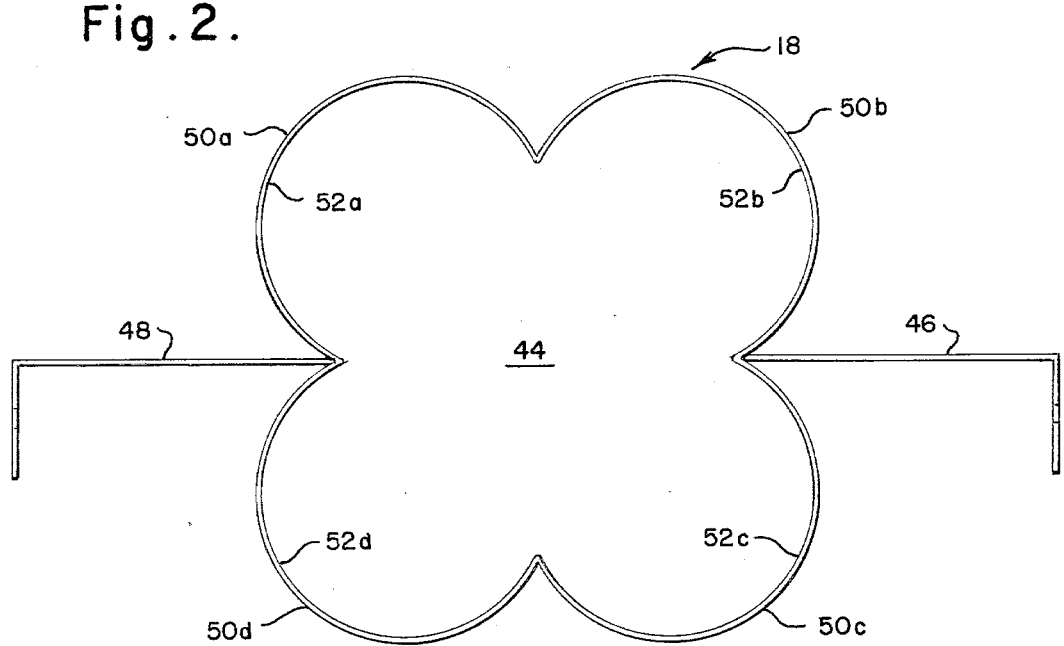
FIG. 2 is an enlarged plan view of the nozzle shown in FIG. 1.
Figure 3:
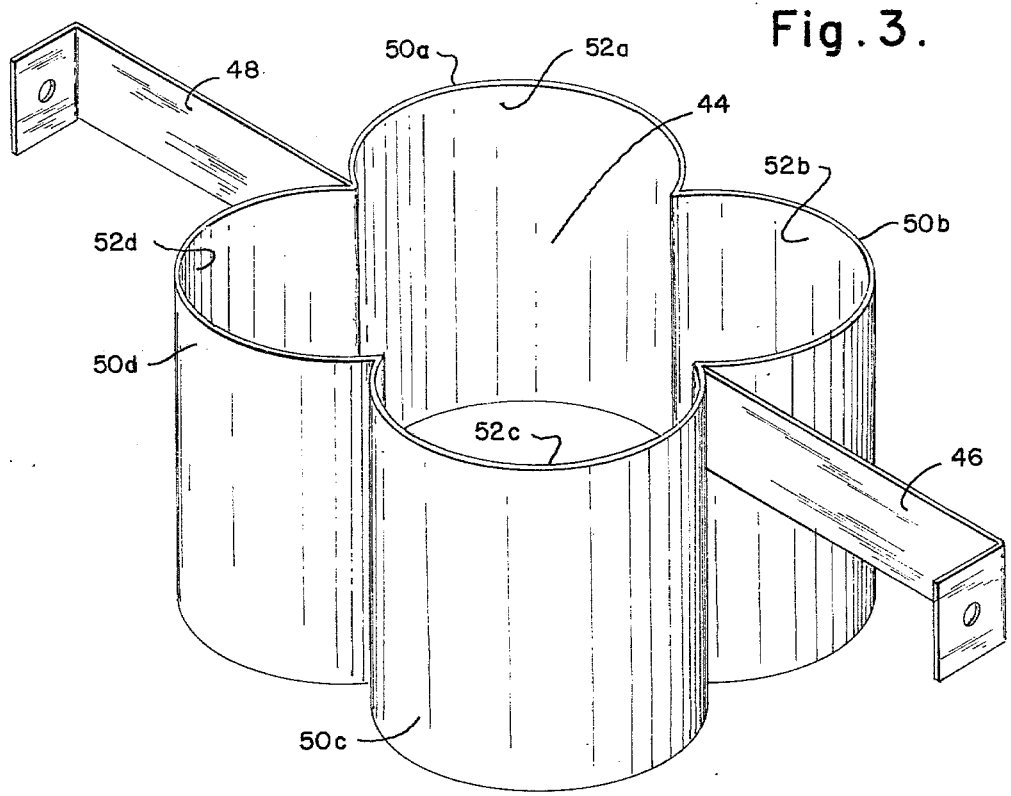
FIG. 3 is a perspective view of the nozzle.

Considering FIG. 2, there is shown that the nozzle 18 comprises a tubular member 42 having a scalloped central passage 44, and an opposed pair of mounting brackets 46, 48 extending generally radially from the uppermost end of the member 42. The member 42 is formed from four substantially identical, elongate, transversely arcuate panels 50a, b, c and d having respective transversely concave inner surfaces 52a, b, c and d as shown in FIG. 1. The panels are juxtaposed to from an annulus such that the concave surfaces 52 collectively present an annular series which defines the lateral boundary of the passage 44.

In the embodiment shown, each concave surface 52 extends through an arc of $\pi$ radians such that the sum total of the arcs presented by surfaces 52 is equal to four $\pi$ radians. Of course, it is to be understood that various other nozzle configurations may also provide the desired results. For example, additional panels 50 could be utilized to provide additional concave surfaces 52, or the arc of each of the surfaces 52 could be increased or decreased as desired. It is believed, however, that better results are obtained when each of the surfaces 52 extends through an arc of $\pi$ radians. Thus, where the passage 44 is defined by a number N of concave surfaces 52, it is preferable that the sum total of the arcs of the surfaces 52 be equal to $N\pi$ radians.

It is important that the sum of the arcs of the surfaces 52 in the series is greater than $2\pi$ radians so that the nozzle passage 44 is scalloped in transverse cross-section. The undulated, wavy boundary of the passage 44 is believed to contribute to the improved performance of the present invention.

As the discharge from the cone 14 passes through the passage 34 of the nozzle 18, the velocity of the swirling snow particles is rapidly dissipated such that upon discharge from the nozzle 18, the particles are moving slowly in a non-diverging, unidirectional downward flow. The unique scalloped transverse cross-section presented by the passage 44 through the nozzle 18 dissipates the swirling movement of the snow particles in such a short vertical distance that there are no snow clogging problems presented by the nozzle. Moreover, there is no structure within the nozzle 18 which would tend to collect snow particles in a manner to promote blockage of the flow through the passage 44.

INDUSTRIAL APPLICABILITY

The nozzle 18 of the present invention is particularly suited for shaping the carbon dioxide snow discharge from a carbon dioxide snow cyclone separator to form a controlled unidirectional flow.

One highly advantageous application of the nozzle 18 is in the high speed filling of meat boxes. It is common in the meat packing industry to pack carbon dioxide snow in a container of meat for preservation during shipment. As explained hereinabove, such packing operation is normally carried out in relatively high speeds and requires that substantial volumes of carbon dioxide snow be rapidly directed into the limited confines of the shipping container. While a carbon dioxide snow cyclone separator is capable of providing the high volumes of snow required for such packing operations, it has heretofore been impossible to accurately direct the discharge from the separator in a manner to avoid undesired wastage of carbon dioxide snow.

With the nozzle of the present invention, a uniform, unidirectional discharge is obtained such that the shipping boxes may be rapidly filled without uncontrolled flow of carbon dioxide snow. Thus, packing costs can be appreciably reduced due to reduced use of carbon dioxide snow.

What I claim is:

1. A nozzle for shaping the violently swirling carbon dioxide snow discharge from a carbon dioxide snow cyclone separator to form a non-diverging, unidirectional flow, said nozzle comprising:

an elongate body adapted to be disposed in a longitudinally upright position beneath said cyclone separator; and a passage extending lengthwise through said body for receiving the carbon dioxide snow discharge from said separator, said passage having a scalloped transverse cross-section for reshaping said discharge as the latter flows through said passage, the lateral boundary of said passage being defined by an annular series of elongate, transversely concave, juxtaposed cylindrical surfaces formed in said body, each of said surfaces extending through an arc of predetermined radians, the sum of the arcs of all the surfaces in said series being greater than $2\pi$ radians.

2. The nozzle of claim 1, said series comprising N surfaces, said sum of said arcs being at least $N\pi$ radians, and N is an integer greater than 2.

3. The nozzle of claim 2, all of said surfaces in the series being identical in size and configuration.

4. The nozzle of claim 2, said surfaces having a uniform radius of curvature, said radius of curvature being in the range from 2 to 3 inches.

5. The nozzle of claim 4, wherein N is 4.

6. In a carbon dioxide snow hood having means for generating a flow of mixed carbon dioxide vapor and carbon dioxide snow and a cyclone separator for separating said flow of carbon dioxide vapor and snow to form a concentrated discharge of carbon dioxide snow, an improved nozzle for receiving and reforming the discharge from said separator, said nozzle including:

an elongate body adapted to be disposed in a longitudinally upright position beneath said cyclone separator; and a passage extending lengthwise through said body for receiving the carbon dioxide snow discharge from said separator, said passage having a scalloped transverse cross-section for reshaping said discharge as the latter flows through said passage, the lateral boundary of said passage being defined by an annular series of elongate, transversely concave, juxtaposed cylindrical surfaces formed in said body, each of said surfaces extending through an arc of predetermined radians, the sum of the arcs of all the surfaces in said series being greater than $2\pi$ radians.

* * * * *